United States Patent
Kwon

(10) Patent No.: US 11,888,253 B2
(45) Date of Patent: Jan. 30, 2024

(54) CONNECTOR, BATTERY MANAGEMENT UNIT, AND BATTERY PACK

(71) Applicant: LG Energy Solution, Ltd., Seoul (KR)

(72) Inventor: Jae-Kuk Kwon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 232 days.

(21) Appl. No.: 17/425,178

(22) PCT Filed: Aug. 27, 2020

(86) PCT No.: PCT/KR2020/011507
§ 371 (c)(1),
(2) Date: Jul. 22, 2021

(87) PCT Pub. No.: WO2021/045449
PCT Pub. Date: Mar. 11, 2021

(65) Prior Publication Data
US 2022/0123492 A1    Apr. 21, 2022

(30) Foreign Application Priority Data

Sep. 2, 2019 (KR) .......................... 10-2019-0108439

(51) Int. Cl.
*H01R 25/16* (2006.01)
*H01R 13/115* (2006.01)
(Continued)

(52) U.S. Cl.
CPC ........ *H01R 13/115* (2013.01); *H01M 10/425* (2013.01); *H01R 12/716* (2013.01);
(Continued)

(58) Field of Classification Search
CPC .. H01R 13/115; H01R 12/716; H01R 13/422; H01R 13/50; H01R 12/58;
(Continued)

(56) References Cited

U.S. PATENT DOCUMENTS 5,553,675 A    9/1996 Pitzen et al.
7,677,919 B1   3/2010 Lin
(Continued)

FOREIGN PATENT DOCUMENTS

CN    2439118 Y    7/2001
CN    201207474 Y   3/2009
(Continued)

OTHER PUBLICATIONS

International Search Report for PCT/KR2020/011507 dated Dec. 18, 2020.
(Continued)

*Primary Examiner* — Abdullah A Riyami
*Assistant Examiner* — Nelson R. Burgos-Guntin
(74) *Attorney, Agent, or Firm* — Birch, Stewart, Kolasch & Birch, LLP

(57) ABSTRACT

A connector with increased durability is provided. A connector includes a mount electrically connected to a battery management unit configured to manage voltages of a plurality of battery cells; a first clip terminal and a second clip terminal configured to be elastically deformable and configure to contact a counterpart connection terminal; and a terminal housing including a side wall configured to electrically insulate the first clip terminal and the second clip terminal from an outside, wherein each of the first clip terminal and the second clip terminal includes a connection portion having a part configured to contact the counterpart connection terminal inserted between the first clip terminal and the second clip terminal; and a support portion extending from the connection portion and configured to be supported by the sidewall of the terminal housing.

15 Claims, 7 Drawing Sheets

(51) Int. Cl.
  *H01M 10/42* (2006.01)
  *H01R 12/71* (2011.01)
  *H01R 13/422* (2006.01)
  *H01R 13/50* (2006.01)
(52) U.S. Cl.
  CPC ............ *H01R 13/422* (2013.01); *H01R 13/50* (2013.01); *H01M 2010/4271* (2013.01)
(58) Field of Classification Search
  CPC ............ H01R 13/2457; H01R 12/7088; H01R 13/113; H01R 9/24; H01R 13/11; H01R 11/281; H01R 4/26; H01R 4/48; H01R 13/24; H01M 10/425; H01M 2010/4271; H01M 50/213; H01M 50/287; H01M 50/503; Y02E 60/10
  See application file for complete search history.

(56) References Cited

U.S. PATENT DOCUMENTS

| | | | | |
|---|---|---|---|---|
| 9,936,594 | B2* | 4/2018 | Fukushima | ......... H01M 50/569 |
| 10,998,573 | B2 | 5/2021 | Zhang | |
| 2001/0021609 | A1 | 9/2001 | Chiang | |
| 2004/0121654 | A1 | 6/2004 | Chao et al. | |
| 2006/0030191 | A1 | 2/2006 | Tuin et al. | |
| 2009/0111015 | A1* | 4/2009 | Wood | ............ H01M 10/12 429/164 |
| 2010/0124693 | A1* | 5/2010 | Kosugi | ............... H01M 50/516 429/92 |
| 2010/0203363 | A1 | 8/2010 | Kwak et al. | |
| 2010/0291434 | A1 | 11/2010 | Byun et al. | |
| 2012/0328908 | A1* | 12/2012 | Han | ............... H01M 50/519 429/7 |
| 2013/0288530 | A1* | 10/2013 | Zhao | ............ H01M 50/503 439/627 |
| 2014/0302353 | A1 | 10/2014 | Ogura | |
| 2014/0329124 | A1* | 11/2014 | Frohnmayer | ........ H01M 50/213 429/100 |
| 2016/0064848 | A1 | 3/2016 | Yu et al. | |
| 2016/0072112 | A1* | 3/2016 | Smith | ................. H01M 50/569 429/93 |
| 2017/0279301 | A1 | 9/2017 | Iwatsuki et al. | |
| 2017/0338520 | A1* | 11/2017 | Lim | ..................... H01R 25/165 |
| 2018/0055324 | A1 | 3/2018 | Hwang et al. | |
| 2018/0108887 | A1* | 4/2018 | Klomberg | ............. H01M 10/60 |
| 2019/0081309 | A1* | 3/2019 | Capati | ................. H01M 50/213 |
| 2019/0081364 | A1* | 3/2019 | Capati | ................. H01M 50/516 |
| 2019/0259984 | A1 | 8/2019 | Nishikawa et al. | |
| 2020/0295413 | A1* | 9/2020 | Yamazaki | ........... H01M 10/482 |

FOREIGN PATENT DOCUMENTS

| | | |
|---|---|---|
| CN | 102163783 A | 8/2011 |
| CN | 105406235 A | 3/2016 |
| CN | 207303437 U | 5/2018 |
| CN | 109166994 A | 1/2019 |
| DE | 102006062022 A1 | 7/2008 |
| DE | 102017220015 A1 | 5/2019 |
| EP | 2280436 A2 | 2/2011 |
| IN | WO 2015/111608 A1 | 7/2015 |
| JP | 2011-49115 A | 3/2011 |
| JP | 2014-203704 A | 10/2014 |
| KR | 10-2010-0123067 A | 11/2010 |
| KR | 10-2011-0059386 A | 6/2011 |
| KR | 10-1069798 B1 | 10/2011 |
| KR | 10-1084868 B1 | 11/2011 |
| KR | 10-2014-0027751 A | 3/2014 |
| KR | 10-2016-0057150 A | 5/2016 |
| KR | 10-2017-0055008 A | 5/2017 |
| KR | 10-2018-0023775 A | 3/2018 |
| WO | WO 2016/072041 A1 | 5/2016 |
| WO | WO 2018/079722 A1 | 5/2018 |

OTHER PUBLICATIONS

Extended European Search Report dated Apr. 22, 2022 for Application No. 20859890.4.

* cited by examiner

CONNECTOR, BATTERY MANAGEMENT UNIT, AND BATTERY PACK

TECHNICAL FIELD

The present disclosure relates to a connector, a battery management unit, and a battery pack, and more particularly, to a connector with increased durability.

The present application claims priority to Korean Patent Application No. 10-2019-0108439 filed on Sep. 2, 2019 in the Republic of Korea, the disclosures of which are incorporated herein by reference.

BACKGROUND ART

Recently, secondary batteries capable of charging and discharging have been widely used as an energy source for wireless mobile devices. In addition, secondary batteries are attracting attention as a power source for electric vehicles (EVs) and hybrid electric vehicles (HEVs), which are proposed as a solution to air pollution such as existing gasoline vehicles and diesel vehicles that use fossil fuels.

In small mobile devices, one or two or three battery cells per device are used, whereas in medium and large devices such as automobiles, due to the need for high power and large capacity, medium and large battery modules electrically connecting multiple battery cells are used. A battery pack implemented by connecting such multiple battery cells is used.

Since such battery packs are preferably manufactured in a small size and weight as possible, battery packs may be stacked with a high degree of integration, and square shape cells, pouch type cells, etc. having a small weight to capacity are mainly used as battery cells applied to a battery pack.

In addition, in order for the battery pack to provide output and capacity required in a given apparatus or device, it is necessary to electrically connect a plurality of battery cells in series, in parallel, or in a combination of series and parallel. For example, the battery cells included in the battery pack may be welded to a plurality of bus bar plates provided with electrode terminals in the form of metal plates and electrically connected in series, in parallel, or in a combination of series and parallel.

Moreover, since the battery pack has a structure in which a plurality of battery cells are combined, the battery pack requires a sensing means capable of sensing a current generated from the battery cells in order to detect when some battery cells are overvoltage, overcurrent, or overheating. Such sensing means are individually connected to the battery cells to provide voltage/current information of the battery cells to a battery management unit.

Such a battery management unit may include a printed circuit board in which a printed circuit is embedded. In addition, the battery management unit needs a connector mounted on the printed circuit board in order to exchange signals with an external device or to receive power from the outside to charge the battery cells or to supply power to the external device to discharge the battery cells. Such a connector may be repeatedly connected to and disconnected from a counterpart connector.

However, in the related art, as the connection and disconnection of the connector and the counterpart connector inserted into the connector are repeated, a connection region of the connector is damaged or permanently deformed, which enables the connection of the connector even when the counterpart connector is inserted into the connector, resulting in a connection failure.

DISCLOSURE

Technical Problem

The present disclosure is designed to solve the problems of the related art, and therefore the present disclosure is directed to providing a connector with increased durability.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a connector including a mounting unit electrically connected to a battery management unit configured to manage voltages of a plurality of battery cells; a first clip terminal unit and a second clip terminal unit configured to be elastically deformable and to contact a counterpart connection terminal; and a terminal housing including a side wall configured to electrically insulate the first clip terminal unit and the second clip terminal unit from an outside, wherein each of the first clip terminal unit and the second clip terminal unit includes a connection portion having a part contacting a counterpart connection terminal inserted between the first clip terminal unit and the second clip terminal unit; and a support portion extending from the connection portion and configured to be supported by the sidewall of the terminal housing.

The connection portion may include a first extension structure extending in a direction in which the counterpart connection terminal is located, and a second extension structure bent and extending from the first extension structure in a direction in which the side wall of the terminal housing is located.

The support portion may include a third extension structure bent and extending from the second extension structure so that at least a part of the support portion is supported by an inner surface of the side wall of the terminal housing.

The connector may further include a main body portion connected to an end portion of each of the first clip terminal unit and the second clip terminal unit and having a plate shape; and a lead extending from the main body portion to penetrate a printed circuit board provided in the battery management unit.

The first clip terminal unit and the second clip terminal unit may be arranged in a left and right direction, and a connection part of the first extension structure and the second extension structure may be configured to contact the counterpart connection terminal, and The side wall of the terminal housing may include a left wall located on a left side of the first clip terminal unit; a right wall located on a right side of the second clip terminal unit; and a rear wall located on a rear side of each of the first clip terminal unit and the second clip terminal unit.

The rear wall of the terminal housing may be configured to support a rear end of each of the first clip terminal unit and the second clip terminal unit forward.

The third extension structure of the first clip terminal unit may be bent and extends rearward from the second extension structure so as to be supported by the left wall, and the third extension structure of the second clip terminal unit may be bent and extends rearward from the second extension structure so as to be supported by the right wall.

The third extension structure of the first clip terminal unit may be bent and extend forward from the second extension structure so as to be supported by the left wall, and the third extension structure of the second clip terminal unit may be bent and extends forward from the second extension structure so as to be supported by the right side wall.

A locking protrusion protruding in an inner direction of the terminal housing may be provided on a front end of each of the left wall and the right wall of the terminal housing.

The third extension structure may be bent in an outer direction from the second extension structure to extend rearward, and the locking protrusion may be configured to support a connection part of the second extension structure and the third extension structure rearward.

The third extension structure may be bent in an inner direction from the second extension structure to extend in a left and right direction, and the locking protrusion may be configured to support the third extension structure rearward.

The third extension structure may be bent in an outer direction from the second extension structure to extend rearward, and the locking protrusion may have a bending structure in a shape bent rearward so as to surround a connection part between the second extension structure and the third extension structure.

The third extension structure may be bent in an inward direction from the second extension structure and obliquely extends rearward, and the locking protrusion may have a bending structure in a shape bent rearward so as to surround the third extension structure.

Each of the first clip terminal unit and the second clip terminal unit may further include a fixing portion integrally connected with the connection portion, located on both sides with respect to the counterpart connection terminal, and configured to be fixed to the terminal housing; and a binding portion including a coupling protrusion protruding from an end of the fixing portion so as to fit into a fixing hole provided in the terminal housing, and the connection portion may be in contact with the counterpart connection terminal by a spring force.

In another aspect of the present disclosure, there is provided a battery management unit including a connector according to the present disclosure, and a printed circuit board electrically connected to the connector.

In another aspect of the present disclosure, there is provided a battery pack including a battery management unit according to the present disclosure and a plurality of battery cells.

Advantageous Effects

According to an aspect of the present disclosure, a connector of the present disclosure includes a support portion configured to extend a connection portion and be supported by a side wall of a terminal housing, and thus when the counterpart connection terminal contacts the connection portion, a transferred force may be offset by a force supporting the support portion by the side wall of the terminal housing. Accordingly, the present disclosure may effectively reduce an occurrence of permanent deformation of the connection portion that may occur when the counterpart connection terminal is inserted in a front and rear direction a large number of times and contacts the connection portion.

Accordingly, it is possible to effectively reduce a connection failure of the connector of the present disclosure.

In addition, according to an aspect of the present disclosure, a connector includes a third extension structure that is bent and extends rearward from a second extension structure so as to be supported by a sidewall of a terminal housing, thereby effectively offsetting a force by which a counterpart connection terminal is inserted by the third extension structure of a support portion. Furthermore, the third extension structure may be in close contact with the sidewall, thereby effectively transferring heat generated in the connector to the terminal housing. Accordingly, it is possible to increase the heat dissipation performance of the connector.

Moreover, according to an aspect of another embodiment of the present disclosure, a locking protrusion protruding in an inner direction of a terminal housing is provided on a front end of each of a right wall and a left wall of the terminal housing, such that the locking protrusion may support a part of a connection portion and a support portion rearward, thereby effectively offsetting a force by which the connection portions of a first clip terminal unit and a second clip terminal unit are separated from each other by inserting of a counterpart connection terminal.

Further, according to another aspect of the present disclosure, a locking protrusion is configured to support a connection part of a second extension structure and a third extension structure rearward, thereby effectively offsetting a force by which connection portions of a first clip terminal unit and a second clip terminal unit are separated from each other by inserting of a counterpart connection terminal with a force used by the locking protrusion to support the third extension structure rearward.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
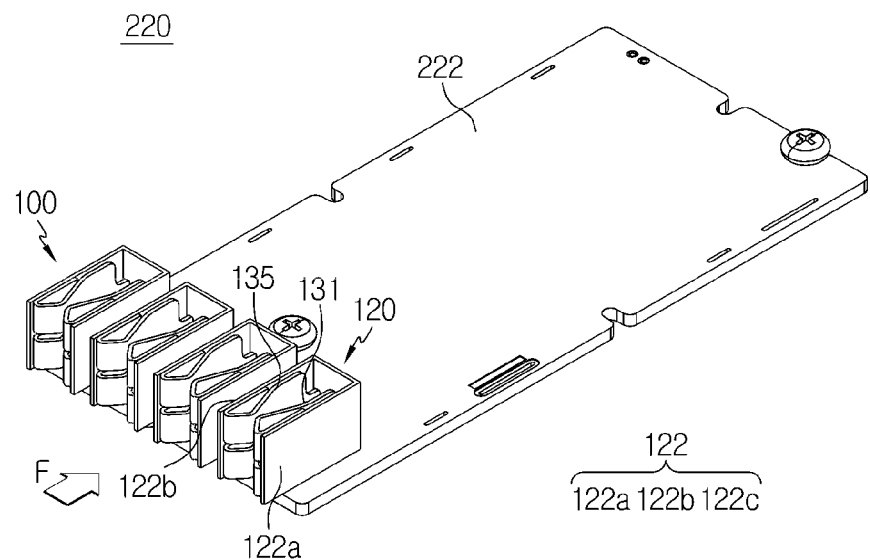
FIG. 1 is a perspective view schematically showing a battery management unit including a connector according to an embodiment of the present disclosure.
Figure 2:
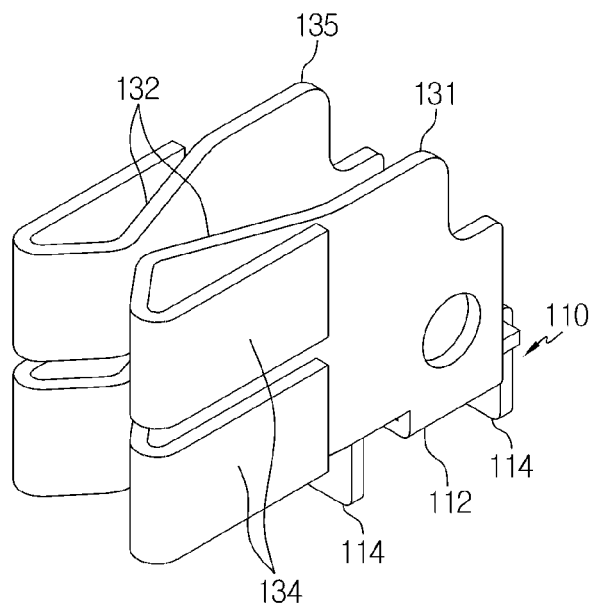
FIG. 2 is a perspective view schematically showing a connector according to an embodiment of the present disclosure.

FIG. 1 is a perspective view schematically showing a battery management unit including a connector according to an embodiment of the present disclosure. FIG. 2 is a perspective view schematically showing a connector according to an embodiment of the present disclosure.

Referring to FIGS. 1 and 2, a connector 100 according to an embodiment of the present disclosure includes a mounting unit 110, a first clip terminal unit 131 and a second clip terminal unit 135, and a terminal housing 120.

Figure 9:
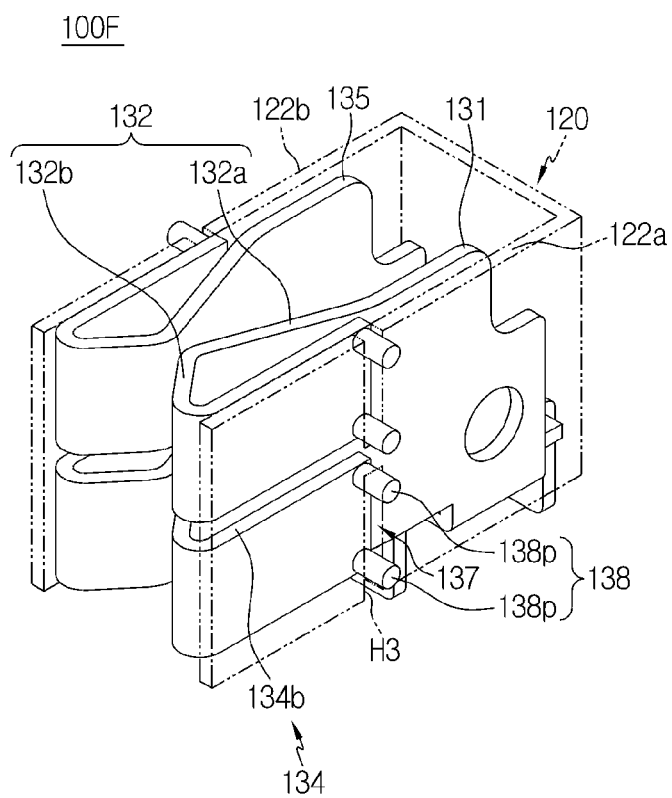
FIG. 9 is a perspective view schematically showing a connector according to another embodiment of the present disclosure.

Specifically, the mounting unit 110 may be configured to be electrically connected to a battery management unit 220 configured to manage voltages of a plurality of battery cells (see 210 of FIG. 9). The mounting unit 110 may be configured to be electrically connected to a printed circuit board 222 provided in the battery management unit 220. The mounting unit 110 may include a lead 114 connected to a printed circuit embedded in the printed circuit board 222. The lead 114 may have a shape protruding downward.

A part of the lead 114 may be inserted through a connection hole (H1 in FIG. 10) of the printed circuit board 222. The lead 114 may have a structure extending downward so as to be electrically connected to the printed circuit board 222. The lead 114 may be inserted into the through hole (H1 of FIG. 10) provided in the printed circuit board 222 and electrically connected to the printed circuit of the printed circuit board 222 by soldering.

In addition, the mounting unit 110 may include a main body portion 112 having a plate shape connected to each of end portions of the first clip terminal unit 131 and the second clip terminal unit 135 and extending in a horizontal direction. The lead 114 may be connected to an end portion of the main body portion 112. For example, as shown in FIG. 3, when viewed in the F direction of FIG. 1, the mounting unit 110 may include the main body portion 112 of a plate shape extending in the horizontal direction, and two leads 114 bent downward and extending from both ends of the main body portion 112 in a front and rear direction.

Here, terms representing directions such as before, after, left, right, up, and down described in the present specification may vary depending on the position of an observer or the shape of an object that is placed. However, in the present specification, for convenience of description, the directions such as front, rear, left, right, up, and down are indicated separately based on when viewed in the F direction.

Figure 3:
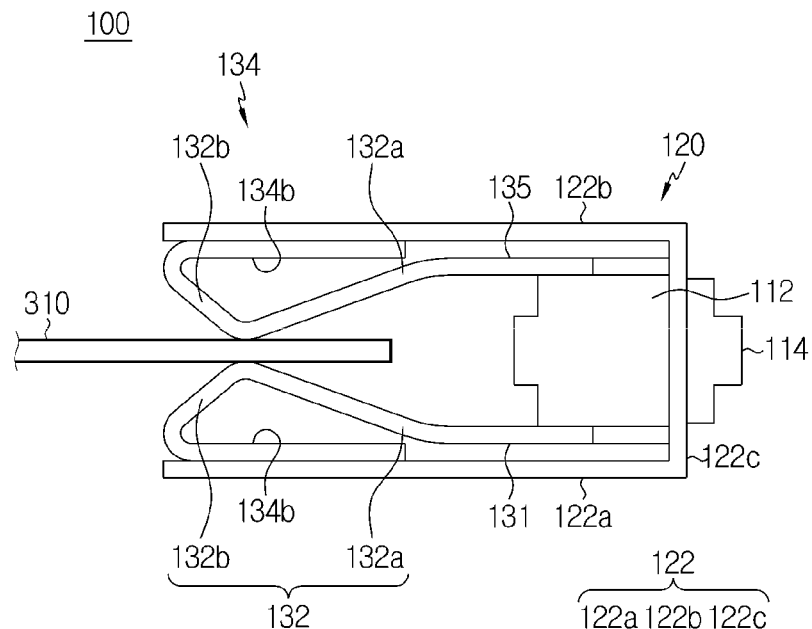
FIG. 3 is a plan view schematically showing a connector according to an embodiment of the present disclosure.

In addition, the first clip terminal unit 131 and the second clip terminal unit 135 may be configured to be elastically deformable and to contact a counterpart connection terminal (see 310 of FIG. 3).

Each of the first clip terminal unit 131 and the second clip terminal unit 135 may have a plate shape erected in a vertical direction so as to contact the counterpart connection terminal 310. Here, the 'counterpart connection terminal' refers to a connection terminal that contacts the connector 100 in order for the connector 100 to transfer a current transferred from a plurality of battery cells (see 210 of FIG. 11) to an external device or receive power from a charger to charge the plurality of battery cells 210. That is, power of the battery pack 200 may be supplied to an external device through the counterpart connection terminal 310. The external device may be, for example, an electric motor (not shown) of a vacuum cleaner.

The counterpart connection terminal 310 may include an alloy having aluminum, nickel, copper, or the like having excellent electrical conductivity. Likewise, the first clip terminal unit 131, the second clip terminal unit 135, and the mounting unit 110 may include an alloy having aluminum, nickel, copper, etc. having excellent electrical conductivity.

The terminal housing 120 may be configured to electrically insulate the first clip terminal unit 131 and the second clip terminal unit 135 from the outside. The terminal housing 120 may include an electrically insulating material. For example, the electrical insulating material may be a plastic material such as polyvinyl chloride or polyethylene terephthalate.

The terminal housing 120 may include a side wall 122. Specifically, the side wall 122 of the terminal housing 120 may include a right wall 122a located on the right side of the first clip terminal unit 131, a left wall 122b located on the left side of the second clip terminal unit 135, and a rear wall 122c located on the rear side of each of the first clip terminal unit 131 and the second clip terminal unit 135 when viewed from the F direction of FIG. 1.

In addition, each of the first clip terminal unit 131 and the second clip terminal unit 135 may include a connection portion 132 and a support portion 134. Specifically, a part of the connection portion 132 may be configured to contact the counterpart connection terminal 310. In the connection portion 132, the counterpart connection terminal may be inserted between the first clip terminal unit 131 and the second clip terminal unit 135. In this regard, the counterpart connection terminal 310 may have a plate shape extending long in the front and rear direction and erected in the vertical direction.

Moreover, the support portion 134 may be configured to be supported in one direction by the side wall 122 of the terminal housing 120 so that permanent deformation of the connection portion 132 is suppressed. The support portion 134 may be formed to extend long from the connection portion 132. The support portion 134 may have the same or similar thickness as the connection portion 132.

Accordingly, according to this configuration of the present disclosure, the connector 100 of the present disclosure includes the support portion 134 configured to extend from the connection portion 132 and be supported by the side wall 122 of the terminal housing 120, and thus when the counterpart connection terminal 310 contacts the connection portion 132, a transferred force may be offset by a force supporting the support portion 134 by the side wall 122 of the terminal housing 120. Accordingly, the present disclosure may suppress the permanent deformation of the connection portion 132 that may occur when the counterpart connection terminal 310 contacts the connection portion 132 in the front and rear direction. Accordingly, it is possible to effectively reduce a connection failure of the connector of the present disclosure.

FIG. 3 is a plan view schematically showing a connector according to an embodiment of the present disclosure.

Referring to FIG. 3 along with FIG. 2, the connection portions 132 of each of the first clip terminal unit 131 and the second clip terminal unit 135 may include a first extension structure 132a and a second extension structure 132b extending from the first extension structure 132a.

Specifically, the first extension structure 132a may have a structure that is bent at a predetermined angle and extends long from both ends of the main body portion 112 in a left and right direction in a direction in which the counterpart connection terminal 310 is located. For example, as shown in FIG. 3, the first extension structure 132a of each of the first clip terminal unit 131 and the second clip terminal unit 135 may have a shape extending from the main body portion 112 of the mounting unit 110 so as to contact the counterpart connection terminal 310.

In addition, the second extension structure 132b may be bent and extend from the first extension structure 132a in a direction in which the sidewall 122 of the terminal housing 120 is located. For example, as shown in FIG. 3, the second extension structure 132b of the first clip terminal unit 131 may be bent and extend from the first extension structure 132a in a direction in which the right wall 122a of the terminal housing 120 is located when viewed from the F direction of FIG. 1. The second extension structure 132b of the second clip terminal unit 135 may be bent and extend from the first extension structure 132a in a direction in which the left wall 122b of the terminal housing 120 is located.

Furthermore, the support portion 134 may include a third extension structure 134b extending in a bent shape rearward from an end portion of the second extension structure 132b. At least a part of the third extension structure 134b may be configured to be supported by an inner surface of the sidewall 122 of the terminal housing 120. For example, as shown in FIG. 3, the third extension structure 134b of the first clip terminal unit 131 may have a structure that is bent and extends to face the right wall 122a of the terminal housing 120. The third extension structure 134b of the second clip terminal unit 135 may have a structure that is bent and extends to face the left wall 122b of the terminal housing 120.

Accordingly, according to this configuration of the present disclosure, the connection portion 132 includes the first extension structure 132a and the second extension structure 132b, and the support portion 134 includes the third extension structure 134b that is bent and extended from the second extension structure 132b, and thus, when the counterpart connection terminal 310 contacts the connection portion 132, a transferred operating force is transferred to the first extension structure 132a and the second extension structure 132b and the third extension structure 134b, such that the operating force may be offset by the sidewall 122 of the terminal housing 120. Accordingly, the present disclosure may suppress permanent deformation of the connection portion 132 that may occur when the counterpart connection terminal 310 frequently contacts the connection portion 132 in the front the rear direction.

The first clip terminal unit 131 and the second clip terminal unit 135 may be spaced apart by a predetermined distance and arranged in the left and right direction. In this regard, the first clip terminal unit 131 and the second clip terminal unit 135 may be spaced apart by a distance by which all the connection portions 132 of the first clip terminal unit 131 and the second clip terminal unit 135 contact the counterpart connection terminals 310. In this regard, a connection portion of the first extension structure 132a and the second extension structure 132b may be configured to contact the counterpart connection terminal 310.

For example, a connection part of the first extension structure 132a and the second extension structure 132b of each of the connection portions 132 of the first clip terminal unit 131 and the second clip terminal unit 135 may be configured to contact the counterpart connection terminal 310.

Therefore, according to this configuration of the present disclosure, the connector 100 of the present disclosure may elastically accommodate the counterpart connection terminal 310 because the connection part of the first extension structure 132a and the second extension structure 132b is configured to contact the counterpart connection terminal 310. In addition, the connector 100 may effectively offset the force by which the counterpart connection terminal 310 is inserted by the third extension structure 134b of the support portion 134 supported by the sidewall 122 of the terminal housing 120.

Further, the rear wall 122c of the terminal housing 120 may be configured to support a rear end of each of the first clip terminal unit 131 and the second clip terminal unit 135 forward. For example, as shown in FIG. 3, the rear wall 122c may be connected to the rear end of each of the right wall 122a and the left wall 122b. The rear wall 122c may be located to face a rear end of the first extension structure 132a of each of the first clip terminal unit 131 and the second clip terminal unit 135 to support the rear end of each of the first clip terminal unit 131 and the second clip terminal unit 135 forward.

Accordingly, according to this configuration of the present disclosure, the rear wall 122c of the terminal housing 120 is configured to support the rear end of each of the first clip terminal unit 131 and the second clip terminal unit 135 forward, thereby applying a support force capable of offsetting the force by which the counterpart connection terminal 310 is inserted from the front to the rear to each of the first clip terminal unit 131 and the second clip terminal unit 135, and thus it is possible to effectively prevent elasticity of the first clip terminal unit 131 and the second clip terminal unit 135 from losing and permanent deformation from occurring.

The third extension structure 134b of the first clip terminal unit 131 may be bent and extend rearward from the second extension structure 132b so as to be supported by the right side wall 122a. In this regard, the third extension structure 134b of the first clip terminal unit 131 may be configured to be in close contact with an inner surface of the right wall 122a. The third extension structure 134b of the second clip terminal unit 135 may be bent and extend rearward from the second extension structure 132b so as to be supported by the left wall 122b. In this regard, the third extension structure 134b of the second clip terminal unit 135 may be configured to be in close contact with an inner surface of the left wall 122b.

Accordingly, according to this configuration of the present disclosure, the connector 100 includes the third extension structure 134b that is bent and extends rearward from the second extension structure 132b so as to be supported by the sidewall 122 of the terminal housing, thereby effectively offsetting the force by which the counterpart connection terminal 310 is inserted by the third extension structure 134b of the support portion 134. Furthermore, the third extension structure 134b may be in close contact with the sidewall 122, thereby effectively transferring heat generated in the connector 100 to the terminal housing 120. Accordingly, it is possible to increase the heat dissipation performance of the connector 100.

Figure 4:
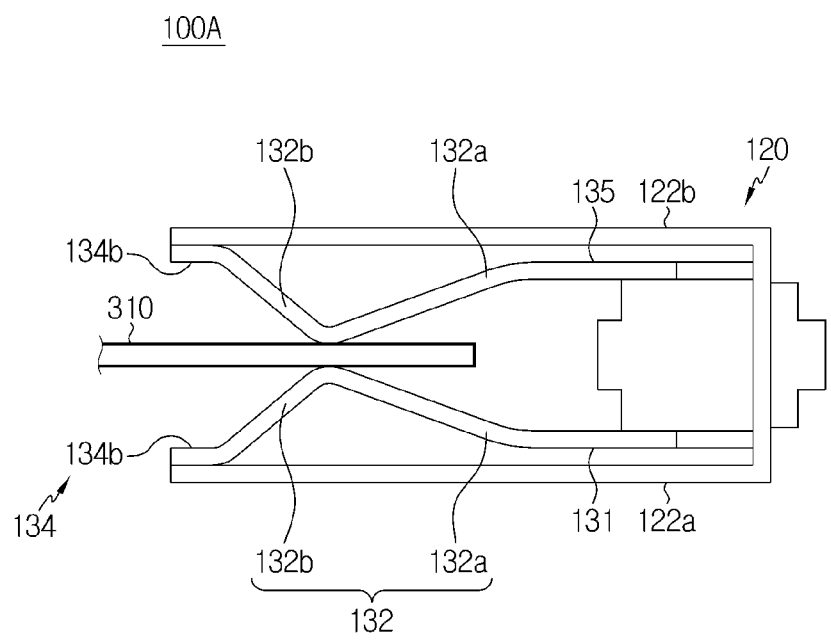
FIG. 4 is a plan view schematically showing a connector according to another embodiment of the present disclosure.

FIG. 4 is a plan view schematically showing a connector according to another embodiment of the present disclosure.

Referring to FIG. 4 together with FIG. 2, a connector 100A of FIG. 4 has a difference in the shape of the third extension structure 134b unlike the connector 100 of FIG. 3. That is, the third extension structure 134b of the first clip terminal unit 131 of FIG. 4 may have a structure that is bent and extends forward from the second extension structure 132b so as to be supported by the right wall 122a. In addition, the third extension structure 134b of the second clip terminal unit 135 may have a shape that is bent and extends forward from the second extension structure 132b so as to be supported by the left wall 122b.

Accordingly, according to this configuration of the present disclosure, the connector 100A includes the third extension structure 134b that is bent and extends forward from the second extension structure 132b so as to be supported by the left wall 122b, thereby effectively offsetting a force by which the counterpart connection terminal 310 is inserted by the third extension structure 134b supported by the sidewall 122 of the terminal housing 120. Furthermore, the third extension structure 134b may be in close contact with the sidewall 122, thereby effectively transferring heat generated in the connector 100A to the terminal housing 120. Accordingly, it is possible to increase the heat dissipation performance of the connector 100A.

Figure 5:
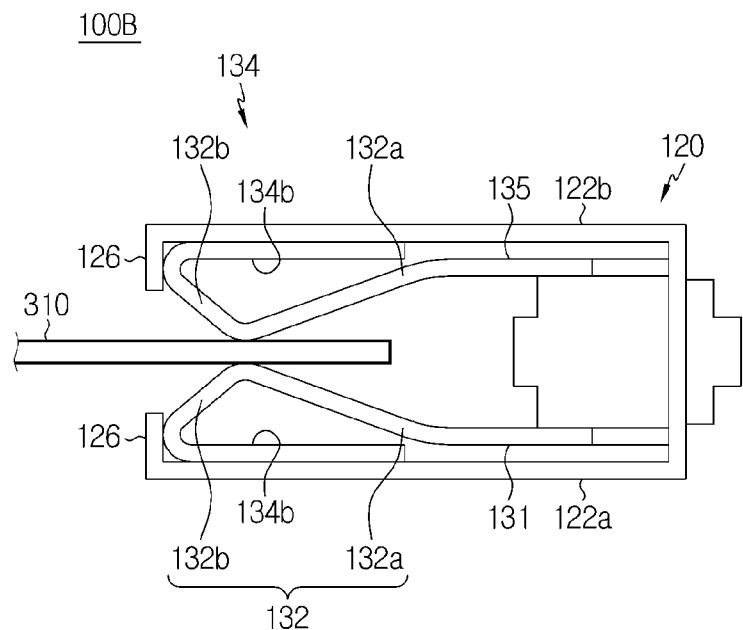
FIG. 5 is a plan view schematically showing a connector according to another embodiment of the present disclosure.

FIG. 5 is a plan view schematically showing a connector according to another embodiment of the present disclosure.

Referring to FIG. 5 along with FIG. 2, a connector 100B according to another exemplary embodiment may further include a locking protrusion 126 on a front end of the terminal housing 120. Specifically, the locking protrusion 126 may protrude in an inner direction of the terminal housing 120 on a front end of each of the right wall 122a and the left wall 122b of the terminal housing 120. Here, the inner direction may be a direction in which the connection portions 132 of the first clip terminal unit 131 and the second clip terminal unit 135 are located. The locking protrusion 126 may be configured to support the connection portion 132 of each of the first clip terminal unit 131 and the second clip terminal unit 135, or the support portion 134, or a part of the connection portion 132 and the support portion 134 rearward.

Therefore, according to this configuration of the present disclosure, the locking protrusion 126 protruding in the inner direction of the terminal housing 120 is provided on the front end of each of the right wall 122a and the left wall 122b of the terminal housing 120, such that the locking protrusion 126 may support a part of the connection portion 132 and the support portion 134 rearward, thereby effectively offsetting a force by which the connection portions 132 of the first clip terminal unit 131 and the second clip terminal unit 135 are separated from each other by inserting of the counterpart connection terminal 310.

Referring back to FIG. 5, the third extension structure 134b may have a shape that is bent in an outer direction and extends rearward from the second extension structure 132b. Here, the 'outer direction' may be a right direction of the first clip terminal unit 131 or a left direction of the second clip terminal unit 135. That is, the outer direction may be a direction opposite to the center between the first clip terminal unit 131 and the second clip terminal unit 135.

The locking protrusion 126 may be configured to support the connection part between the second extension structure 132b and the third extension structure 134b rearward. For example, as shown in FIG. 5, the connection part between the second extension structure 132b and the third extension structure 134b of the first clip terminal unit 131 may be supported by the locking protrusion 126 extending from the right wall 122a of the terminal housing 120 rearward. In addition, the connection part of the second extension structure 132b and the third extension structure 134b of the second clip terminal unit 135 may be supported by the locking protrusion 126 extending from the left wall 122b of the terminal housing 120 rearward.

Therefore, according to this configuration of the present disclosure, the locking protrusion 126 is configured to support the connection part of the second extension structure 132b and the third extension structure 134b rearward, thereby effectively offsetting a force by which the connection portions 132 of the first clip terminal unit 131 and the second clip terminal unit 135 are separated from each other by inserting of the counterpart connection terminal 310 with a force used by the locking protrusion 126 to support the third extension structure 134b rearward.

Figure 6:
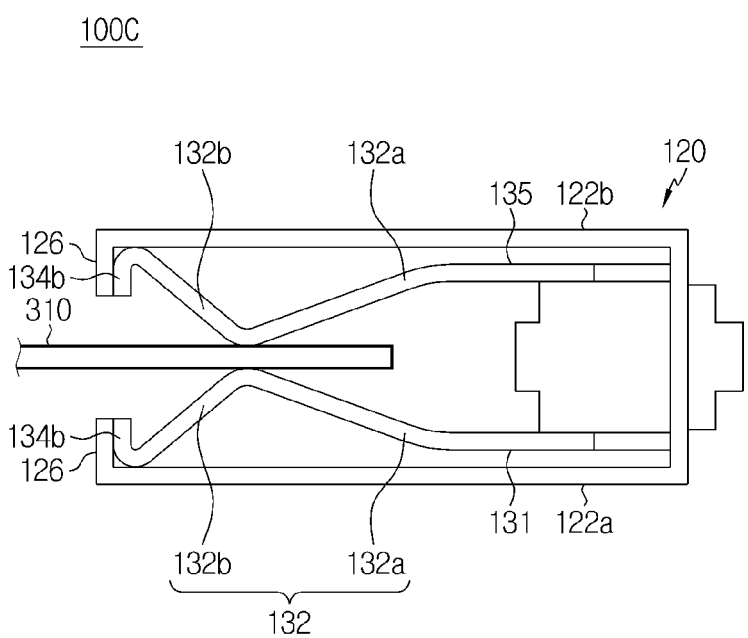
FIG. 6 is a plan view schematically showing a connector according to another embodiment of the present disclosure.

FIG. 6 is a plan view schematically showing a connector according to another embodiment of the present disclosure.

Referring to FIG. 6, the third extension structure 134b of a connector 100C according to another embodiment is bent inward (in a direction facing each other) from the second extension structure 132b to extend in a left and right direction. For example, the third extension structure 134b of the first clip terminal unit 131 may be bent and extend in a left direction from the second extension structure 132b. The third extension structure 134b of the second clip terminal unit 135 may be bent and extend in a right direction from the second extension structure 132b.

In this regard, the locking protrusion 126 may be configured to support the third extension structure 134b extending in the left and right direction rearward. For example, the locking protrusion 126 connected to the right side wall 122a of the terminal housing 120 may support the third extension structure 134b of the first clip terminal unit 131 rearward. The locking protrusion 126 connected to the left wall 122b of the terminal housing 120 may support the third extension structure 134b of the second clip terminal unit 135 rearward.

Accordingly, according to this configuration of the present disclosure, the locking protrusion 126 is configured to support the third extension structure 134b rearward, thereby effectively offsetting a force by which the connection portions 132 of the first clip terminal unit 131 and the second clip terminal unit 135 are separated from each other by inserting of the counterpart connection terminal 310 with a force used by the locking protrusion 126 to support the third extension structure 134b rearward.

Figure 7:
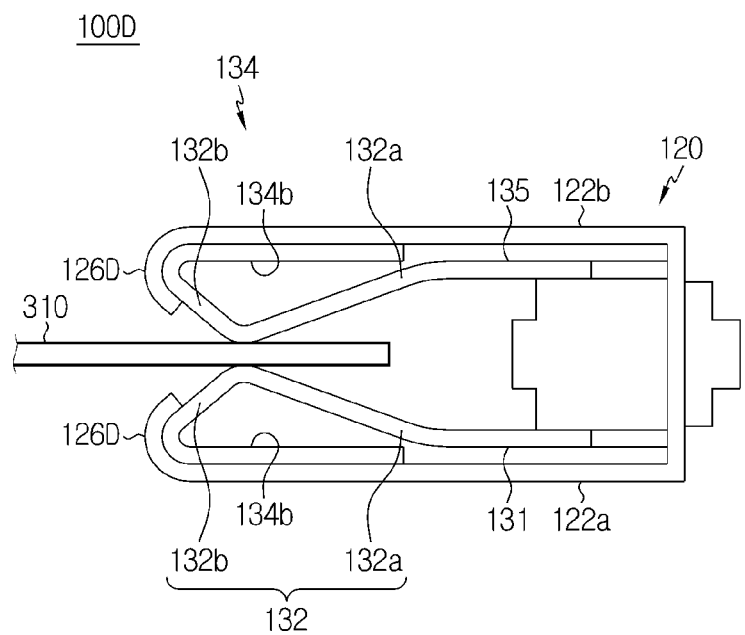
FIG. 7 is a plan view schematically showing a connector according to another embodiment of the present disclosure.

FIG. 7 is a plan view schematically showing a connector according to another embodiment of the present disclosure.

Referring to FIG. 7, the third extension structure 134b of a connector 100D according to another embodiment of FIG. 7 may be bent in an outer direction from the second extension structure 132b and extend rearward, like the third extension structure 134b of FIG. 5, whereas, unlike the locking protrusion 126 of FIG. 6, a locking protrusion 126D of FIG. 7 may have a bending structure extending in a bent shape rearward. That is, the locking protrusion 126D may be further bent rearward to surround a connection part between the second extension structure 132b and the third extension structure 134b.

For example, the locking protrusion 126D connected to the right wall 122a of the terminal housing 120 may have a shape bent rearward to surround a connection part of the second extension structure 132b and the third extension structure 134b of the first clip terminal unit 131. The locking protrusion 126D connected to the left wall 122b of the terminal housing 120 may have a shape bent rearward to surround a connection part of the second extension structure 132b and the third extension structure 134b of the second clip terminal unit 135.

Therefore, according to this configuration of the present disclosure, the locking protrusion 126D has a shape bent rearward to surround the connection part between the second extension structure 132b and the third extension structure 134b, thereby applying a support force capable of offsetting a deformed force of the second extension structure 132b and the third extension structure 134b formed by the counterpart connection terminal 310. Accordingly, the present disclosure may effectively prevent permanent deformation of the first clip terminal unit 131 and the second clip terminal unit 135.

Figure 8:
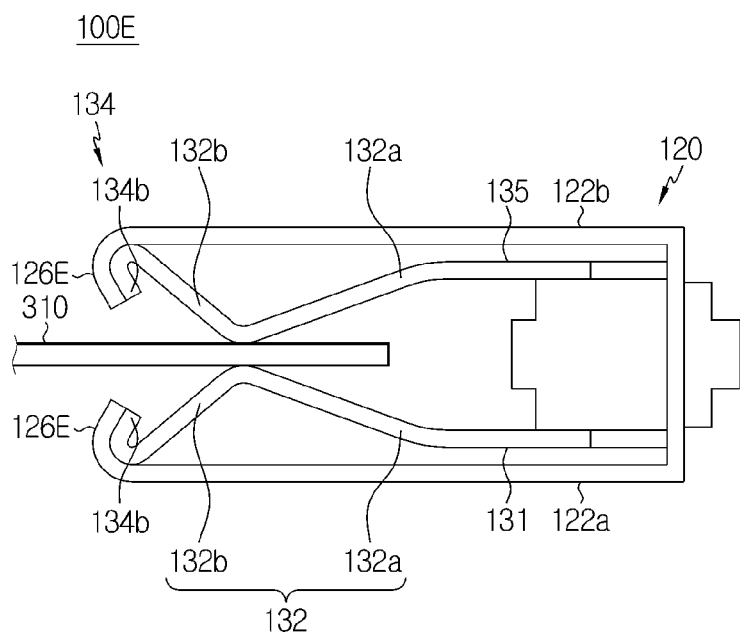
FIG. 8 is a plan view schematically showing a connector according to another embodiment of the present disclosure.

FIG. 8 is a plan view schematically showing a connector according to another embodiment of the present disclosure.

Referring to FIG. 8, a third extension structure 134b of the connector 100E according to another embodiment of FIG. 8 may be bent in an inner direction from the second extension structure 132b, like the third extension structure 134b of FIG. 6. However, the third extension structure 134b of FIG. 8 may extend obliquely rearward.

For example, a locking protrusion 126E connected to the right side wall 122a of the terminal housing 120 has a bending structure in a bent shape rearward to surround the third extension structure 134b of the first clip terminal unit 131. The locking protrusion 126E connected to the left wall 122b of the terminal housing 120 may have a shape bent rearward to surround the third extension structure 134b of the second clip terminal unit 135.

Accordingly, according to this configuration of the present disclosure, the locking protrusion 126E has a shape bent rearward to surround the third extension structure 134b, thereby applying a support force capable of offsetting the deformed force of the second extension structure 132b and the third extension structure 134b formed by the counterpart connection terminal 310, and thus it is effectively prevent the permanent deformation of the first clip terminal unit 131 and the second clip terminal unit 135.

FIG. 9 is a perspective view schematically showing a connector according to another embodiment of the present disclosure.

Referring to FIG. 9 along with FIG. 1, each of the first clip terminal unit 131 and the second clip terminal unit 135 of a connector 100F according to another embodiment may include the connection portion 132, a fixing portion 137, a binding portion 138, and the support portion 134. However, the connection portion 132 and the support portion 134 of FIG. 9 are the same as those previously described, and thus detailed descriptions thereof will not be given below.

The connection portion 132 may be configured such that the counterpart connection terminal 310 is inserted between the first clip terminal unit 131 and the second clip terminal unit 135.

The first clip terminal unit 131 and the second clip terminal unit 135 may be configured such that the counterpart connection terminal 310 is in contact with a part of each connection portion 132 by a spring force.

The fixing portion 137 may be integrally connected with the connection portion 132, located on both sides (outer sides) with respect to the counterpart connection terminal 310, and may be configured to be fixed to the terminal housing 120.

A coupling protrusion 138p protruding from an end portion of the fixing portion 137 so as to be fitted into the fixing hole H3 provided in the terminal housing 120 may be provided on the binding portion 138 to regulate permanent deformation of the connection portion 132.

In addition, the support portion 134 may be configured to extend from the connection portion 132 and be supported by the side wall 122 of the terminal housing 120 so that the permanent deformation of the connection part 132 is suppressed.

Therefore, according to this configuration of the present disclosure, the present disclosure may connect each of the first clip terminal unit 131 and the second clip terminal unit 135 to the terminal housing 120 by the fixing portion 137 and the binding portion 138. Accordingly, the present disclosure may effectively reduce the permanent deformation of the first clip terminal unit 131 and the second clip terminal unit 135.

Figure 10:
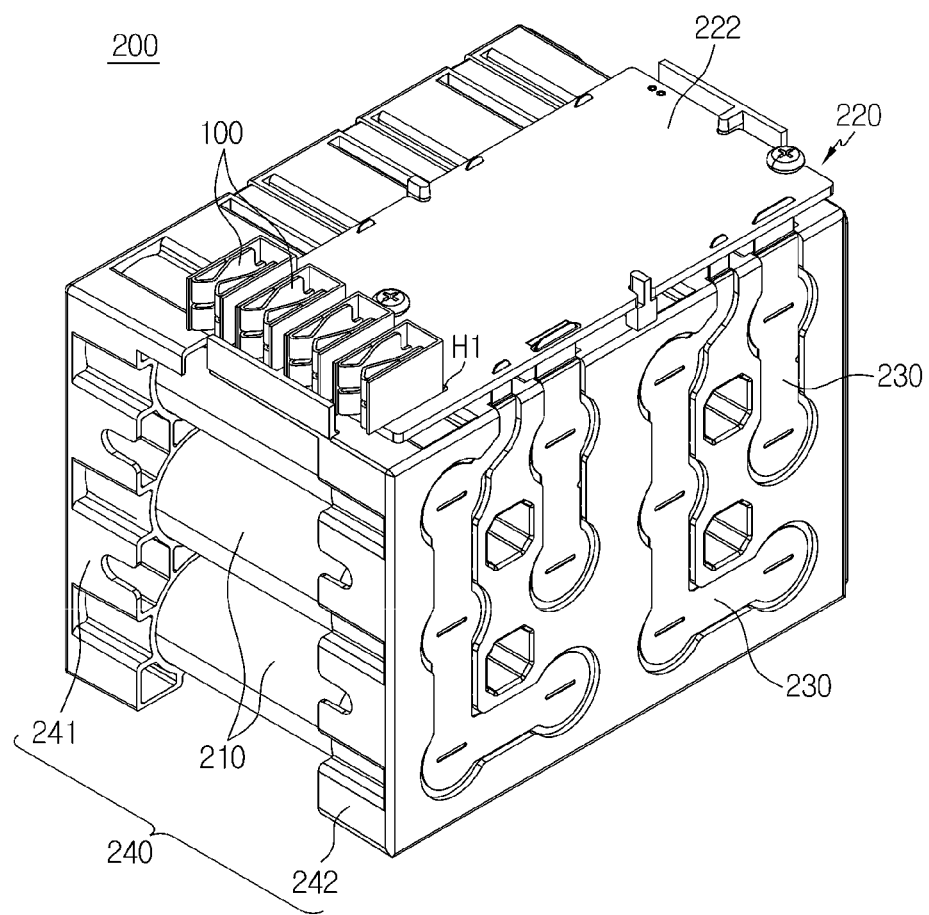
FIG. 10 is a perspective view schematically showing a battery pack according to an embodiment of the present disclosure.
Figure 11:
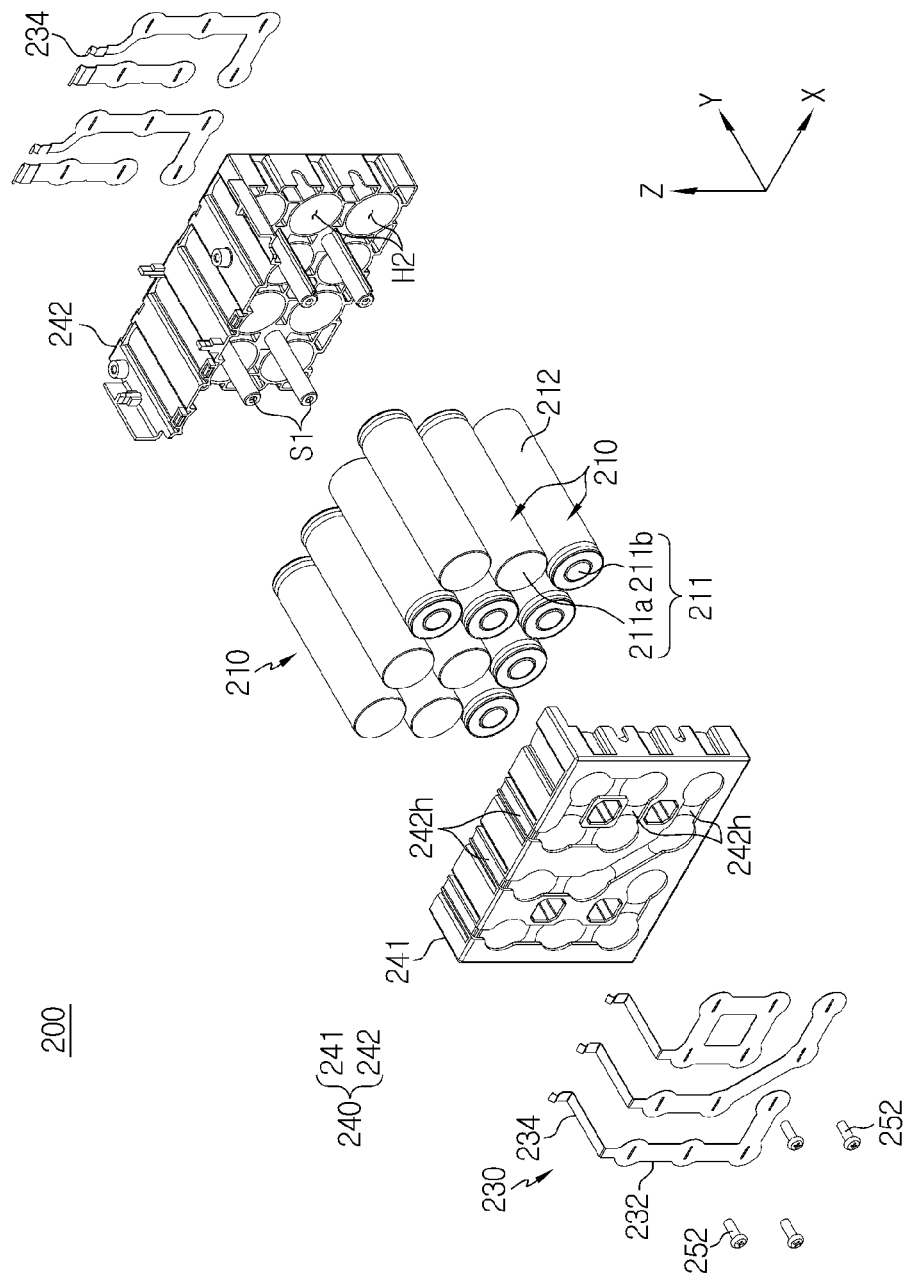
FIG. 11 is an exploded perspective view schematically showing components of a battery pack according to an embodiment of the present disclosure.

FIG. 10 is a perspective view schematically showing a battery pack according to an embodiment of the present disclosure. FIG. 11 is an exploded perspective view schematically showing components of a battery pack according to an embodiment of the present disclosure.

Referring to FIGS. 10 and 11, the battery management unit 220 according to the present disclosure includes the plurality of connectors 100 and the printed circuit board 222 electrically connected to the plurality of connectors 100.

Moreover, the battery pack 200 according to the present disclosure includes the battery pack 200 including the plurality of battery cells 210 and the battery management unit 220. That is, the battery pack 200 according to the present disclosure may include the battery management unit 220 as various devices for controlling charging and discharging of the plurality of battery cells 210.

Specifically, the battery cell 210 may be a cylindrical battery cell. In addition, the cylindrical battery cell 210 may include a cylindrical battery can 212 and an electrode assembly (not shown) accommodated in the battery can 212.

Here, the battery can 212 includes a material having high electrical conductivity, and for example, the battery can 212 may include aluminum, steel, or copper. In addition, electrode terminals 211a and 211b may be respectively formed on both ends of the battery can 212 in a horizontal direction.

Specifically, the electrode terminal 211 may include a first electrode terminal 211a and a second electrode terminal 211b having different electrical polarities. In addition, when viewed in the F direction (shown in FIG. 1), the first electrode terminal 211a may be formed on one end (a front end) of the battery can 212 in the horizontal direction, and the second electrode terminal 211b may be formed on the other end (a rear end) in the horizontal direction.

Further, the electrode assembly may be formed in a structure wound in a jelly-roll type with a separator interposed between a positive electrode and a negative electrode. In addition, a positive electrode tab (not illustrated) may be attached to the positive electrode (not illustrated) to be connected to the first electrode terminal 211a on the front end of the battery can 212. Furthermore, a negative electrode tab (not illustrated) may be attached to the negative electrode (not illustrated) to be connected to the second electrode terminal 211b on the rear end of the battery can 212.

For example, as shown in FIG. 2, the battery pack 200 may include 12 cylindrical battery cells 210 arranged in one direction. In addition, the first electrode terminals 211a of the 12 cylindrical battery cells 210 may be disposed to be adjacent to the second electrode terminals 211b having different polarities.

However, the battery cell 210 according to the present disclosure is not limited to the cylindrical battery cell 210 described above, and various types of battery cells 210 known at the time of filing of the present application may be employed.

The battery pack 200 may further include a pack housing 240 in which an internal space accommodating the plurality of battery cells 210 is formed.

Specifically, the pack housing 240 may include an electrically insulating material. For example, the pack housing 240 may include a plastic material such as polyvinyl chloride. In addition, the pack housing 240 may include a first case 241 and a second case 242. A plurality of hollows H2 may be formed in the first case 241 and the second case 242 so as to surround an outer surface of an upper portion or a lower portion of the cylindrical battery cell 210 so that a plurality of cylindrical battery cells 210 may be accommodated.

Furthermore, a bolt fastening structure may be formed in the first case 241 and the second case 242. For example, as shown in FIG. 11, fastening holes S1 configured to make four bolts 252 inserted thereinto may be formed in the first case 241 and the second case 242. In addition, the four bolts 252 are fastened to the fastening holes S1 of the first case 241 and the second case 242, so that a rear portion of the first case 241 and a front portion of the second case 242 may be coupled to each other.

In addition, inlet grooves 242h may be formed in outer surfaces of the first case 241 and the second case 242 of the pack housing 240 so that at least a part of the connection portion 232 and the sensing portion 234 of the bus bar plate 230 is inserted and fixed.

Specifically, the inlet groove 242h formed on the outer surface of the pack housing 240 may have an inner surface having a size corresponding to the outer shape of the bus bar plate 230. For example, as shown in FIG. 2, the inlet groove 242h into which the connection portion 232 of the bus bar plate 230 may be inserted and embedded may be formed in the outer surface of the front of the first case 241.

In addition, the inlet groove 242h into which a part of the sensing portion 234 of the bus bar plate 230 may be inserted and fixed may be formed in an upper outer surface of the first case 241. Similarly, the inlet groove 242h may also be formed in a rear outer surface and an upper outer surface of each of the second case 242 of the pack housing 240 so that a part of the connection portion 232 and the sensing portion 234 of the bus bar plate 230 may be inserted and fixed.

Accordingly, according to this configuration of the present disclosure, the inlet grooves 242h may be formed in the outer surface of the pack housing 240 so that at least a part of the connection portion 232 and the sensing portion 234 of the bus bar plate 230 is inserted and fixed, and thus the busbar plate 230 may stably establish an electrical connection between the plurality of battery cells 210, and prevent the busbar plate 230 from being damaged from external substances. In addition, since the sensing portion 234 of the bus bar plate 230 may be prevented from flowing due to an external impact, the electrical connection between the battery management unit 220 and the plurality of battery cells 210 may be stably maintained. Accordingly, durability of the battery pack 200 may be improved.

In addition, the printed circuit board 222 on which the plurality of connectors 100 are mounted may be mounted to the upper portion of the pack housing 240.

Meanwhile, in the present specification, although the terms indicating directions such as up, down, left, right, front, and back are used, it is apparent to those skilled in the art that these terms are for convenience of explanation only and vary depending on the position of a target object or the position of an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| [Description of Reference Numerals] | |
|---|---|
| 100: connector | 110: mounting unit |
| 120: terminal housing | |
| 122, 122a, 122b, 122c: side wall, right wall, left wall, rear wall | |
| 131, 135: first clip terminal unit, second clip terminal unit | |
| 132: connection portion | 134: support portion |
| 132a, 132b: first extension structure, second extension structure | |
| 134a: third extension structure | |
| 112, 114: main body portion, lead | 126: locking protrusion |
| 137, 138: fixing portion, binding portion | |
| 138p: coupling protrusion | H1, H2: H3: connection hole, hollow, fixing hole |
| 200: battery pack | 210: battery cell |
| 220: battery management unit | 222: printed circuit board |

INDUSTRIAL APPLICABILITY

The present disclosure relates to a connector. Further, the present disclosure is applicable to a battery pack to which the connector is applied, and an electronic device industry including the battery pack.

What is claimed is:

1. A connector comprising:
a mount electrically connected to a battery management unit configured to manage voltages of a plurality of battery cells;
a first clip terminal and a second clip terminal configured to be elastically deformable and configured to contact a counterpart connection terminal; and
a terminal housing comprising a side wall configured to electrically insulate the first clip terminal and the second clip terminal from an outside,
wherein each of the first clip terminal and the second clip terminal comprises:
a connection portion having a part configured to contact the counterpart connection terminal when inserted between the first clip terminal and the second clip terminal; and
a support portion extending from the connection portion and configured to be supported by the sidewall of the terminal housing,
wherein the connection portion comprises a first extension structure extending in a direction in which the counterpart connection terminal is to be located, and a second extension structure bent and extending from the first extension structure in a direction in which the side wall of the terminal housing is located, and wherein the support portion comprises a third extension structure bent and extending from the second extension structure so that the third extension structure contacts an inner surface of the side wall of the terminal housing or contacts an extension of the sidewall of the terminal housing.

2. The connector of claim 1, further comprising:
a main body portion connected to an end portion of each of the first clip terminal and the second clip terminal and having a plate shape; and
a lead extending from the main body portion configured to penetrate a printed circuit board provided in the battery management unit.

3. The connector of claim 1,
wherein the first clip terminal and the second clip terminal are arranged in a left and right direction,
wherein a connection part of each of the first extension structure and the second extension structure is configured to contact the counterpart connection terminal, and
wherein the side wall of the terminal housing comprises:
a left wall located on a left side of the first clip terminal;
a right wall located on a right side of the second clip terminal; and
a rear wall located on a rear side of each of the first clip terminal and the second clip terminal.

4. The connector of claim 3,
wherein the rear wall of the terminal housing is configured to support a rear end of each of the first clip terminal and the second clip terminal forward of the terminal housing.

5. The connector of claim 3,
wherein the third extension structure of the first clip terminal is bent and extends rearward from the second extension structure so as to be supported by the left wall, and
wherein the third extension structure of the second clip terminal is bent and extends rearward from the second extension structure so as to be supported by the right wall.

6. The connector of claim 3,
wherein the third extension structure of the first clip terminal is bent and extend forward from the second extension structure so as to be supported by the left wall, and
wherein the third extension structure of the second clip terminal is bent and extends forward from the second extension structure so as to be supported by the right side wall.

7. The connector of claim 3,
wherein the extension of the sidewall of the terminal housing includes a locking protrusion protruding in an inner direction of the terminal housing and provided on a front end of each of the left wall and the right wall of the terminal housing.

8. The connector of claim 7,
wherein the third extension structure is bent in an outer direction from the second extension structure to extend rearward of the terminal housing, and
wherein the locking protrusion is configured to support a connection part of the second extension structure and the third extension structure rearward of the terminal housing.

9. The connector of claim 7,
wherein the third extension structure is bent in an inner direction from the second extension structure to extend in a left and right direction, and
wherein the locking protrusion is configured to support the third extension structure rearward of the terminal housing.

10. The connector of claim 7,
wherein the third extension structure is bent in an outer direction from the second extension structure to extend rearward of the terminal housing, and
wherein the locking protrusion has a bending structure in a shape bent rearward of the terminal housing so as to surround a connection part between the second extension structure and the third extension structure.

11. The connector of claim 7,
wherein the third extension structure is bent in an inward direction from the second extension structure and obliquely extends rearward of the terminal housing, and
wherein the locking protrusion has a bending structure in a shape bent rearward of the terminal housing so as to surround the third extension structure.

12. The connector of claim 1,
wherein each of the first clip terminal and the second clip terminal further comprises:
a fixing portion integrally connected with the connection portion, located on both sides with respect to the counterpart connection terminal, and configured to be fixed to the terminal housing; and
a binding portion comprising a coupling protrusion protruding from an end of the fixing portion so as to fit into a fixing hole provided in the terminal housing, and
wherein the connection portion is in contact with the counterpart connection terminal by a spring force.

13. A battery management unit comprising a connector according to claim 1, and a printed circuit board electrically connected to the connector.

14. A battery pack comprising a battery management unit according to claim 13 and the plurality of battery cells.

15. The connector of claim 1, wherein the counterpart connection terminal contacts the second extension structure where the second extension structure is bent.

* * * * *